United States Patent [19]

Halasa

[11] 4,051,308

[45] * Sept. 27, 1977

[54] PROCESS FOR POLYMERIZING BUTADIENE WITH COBALT COMPLEX, $AlR_3$ AND $CS_2$

[75] Inventor: Adel Farhan Halasa, Bath, Ohio

[73] Assignee: The Firestone Tire & Rubber Company, Akron, Ohio

[*] Notice: The portion of the term of this patent subsequent to Nov. 23, 1993, has been disclaimed.

[21] Appl. No.: 629,437

[22] Filed: Nov. 6, 1975

Related U.S. Application Data

[63] Continuation of Ser. No. 491,721, July 25, 1974, abandoned.

[51] Int. Cl.$^2$ .............................. C08F 1/52; C08F 3/18
[52] U.S. Cl. .................................... 526/141; 526/136; 526/140; 526/335
[58] Field of Search ................ 260/94.3, 80.7, 88.2 E, 260/94.2 R, 94.4, 94.6; 526/140, 141, 335

[56] References Cited

U.S. PATENT DOCUMENTS

| | | | |
|---|---|---|---|
| 3,135,725 | 6/1964 | Carlson | 260/94.3 |
| 3,300,466 | 1/1967 | Marullo | 260/94.3 |
| 3,778,424 | 12/1973 | Sugiura | 260/94.3 |
| 3,824,226 | 7/1974 | Gunther | 260/94.3 |

*Primary Examiner*—Christopher A. Henderson

[57] ABSTRACT

1,3-Butadiene is polymerized in the liquid phase in the presence of a catalyst composition comprising:
 a. A complex of a cobalt salt;
 b. $AlR_3$ wherein R is hydrocarbon, and
 c. $CS_2$.

The complex comprises one of a cobalt salt, preferably $CoCl_2$, with an organic compound containing nitrogen and oxygen or sulfur, preferably with no more than 2 carbon atoms separating the nitrogen and oxygen or sulfur, and the organometal reducing agent $AlR_3$, wherein R is a hydrocarbon radical, preferably of no more than 10 carbon atoms. The polybutadiene has a microstructure of at least 80% and generally more than 90% 1,2, is also syndiotactic in character, has a melting point of 190°–227° C, and may be obtained in approximately quantitative yields.

14 Claims, No Drawings

PROCESS FOR POLYMERIZING BUTADIENE WITH COBALT COMPLEX, ALR₃ AND CS₂

This is a continuation, of application Ser. No. 491,721 filed July 25, 1974, now abandoned.

BACKGROUND OF THE INVENTION

1. Field of the Invention

This invention relates to a process for the preparation in high yield of a polybutadiene high in 1,2 microstructure and syndiotactic in character. More specifically this process involves the polymerization of 1,3-butadiene in the presence of a novel catalyst composition.

2. Related Prior Art

U.S. Pat. No. 3,778,424 discloses the preparation of 1,2-polybutadiene which is syndiotactic in character and uses for the polymerization of 1,3-butadiene a catalyst composition comprising (a) a soluble cobalt compound, (b) an AlR₃ compound in which R is a hydrocarbon radical of 1–6 carbon atoms, and (c) CS₂. The soluble cobalt compound is defined as including, amoung various other compounds (1) a cobalt salt of an organic carboxylic acid of at least 6 carbon atoms, such as cobalt octoate and cobalt naphthenate and (2) a complex of a cobalt halide, such as $CoCl_2$, with "a tertiary amine, e.g. pyridine, triethylamine, tributylamine and dimethylaniline, . . . ; and an N,N-dialkylamide, e.g., N,N=dimethyl formanide, N,N-dimethyl acetamide and N,N-diethyl formamide." The only such complex exemplified in the patent is the $CoCl_2$ complex with pyridine.

In the above patent it is indicated that the prior art method of preparing syndiotactic 1,2-polybutadiene is unsatisfactory because of low yields as well as unsatisfactory physical properties. However, the best yield shown in the patent is in Table 5 where the control experiment shows a yield of 56%. Moreover, the $CoCl_2$-pyridine complex used in Example 13 produces a yield of only 38%.

As indicated by the same patentees the melting point of 200°–210° C for the polymers produced by their process makes it difficult to process these polymers. To remedy this problem patentees suggest the use of an organonitrile as a fourth catalyst component to lower the melting point to as low as 100° C. However, as shown in Examples 15–28, the presence of the nitrile also has an adverse effect on the yield (10–35%) and on the 1,2 content, taking it as low as 79%.

SUMMARY OF THE INVENTION

In accordance with the present invention it has been found that the yields may be improved up to substantially quantitative and the processability of the products improved without loss in yield or 1,2 content by preparing polybutadiene of high 1,2 content and syndiotactic character by the process of polymerizing 1,3-butadiene in liquid phase in the presence of a catalyst composition comprising:

a. A cobalt salt complex, that is of $CoX_n$ wherein X is a salt residue, such as a halide or carboxylate, and $n$ is 2 to 3, with a cyclic nitrogen compound also containing a $>C=O$ or $>C=S$ group therein;

b. AlR₃ as the reducing agent, wherein R is a hydrocarbon radical of 1–8 carbon atoms; and c. $CS_2$. By this process it is possible to reduce the molecular weight so that the melting point is below 200° C, and thereby the polymer is more easily processed, but at the same time the high degree of crystallinity is maintained.

In this catalyst composition the proportion of Co to monomer is in the range of 0.01–1.0, preferably 0.02–0.1 millimoles of Co per 100 gms of monomer; the ratio of Al/Co is 10–500, preferably 25–75 moles of Al per mole of Co; the ratio of $CS_2$/Co is 1–10, preferably 2–6 moles of $CS_2$ per mole Co; and the ratio of amino-keto compound is 1–30 moles of such compound per mole of Co compound, preferably 1–16 moles when a pyrrolidone is used and 1–6 moles when a lactam is used per mole of Co compound.

Contrary to the above-mentioned patent, the cobalt compound does not need to be soluble in the reaction medium and may merely be suspended in the medium. Actually the majority of Co compounds used in the practice of this invention are soluble only in aromatic hydrocarbons and insoluble in aliphatic hydrocarbons. None the less, polymerization may be conducted not only in aromatic solvents, such as benzene, toluene, xylene, etc., but also suspended in aliphatic non-solvents such as hexane, heptane, octane, decane, cyclohexane, cycloheptane etc. If desired, the polymerization may be conducted in liquid butadiene.

Furthermore, also contrary to the above patent, the nitrogen compound does not need to be a tertiary amine, and as illustrated below various secondary and primary amines may be used provided they also meet the other limitations or requirements of this invention.

Typical cobalt complexes that may be used in the catalyst compositions of this invention include: cobalt salt complexes with compounds containing both nitrogen and a $>C=O$ or $>C=S$ group, such as the complexes of a cobalt compound with N-methylpyrrolidone, caprolactam, pyrrolidone, o,m or p-aminoacetophenone, o,m or p-aminobenzophenone, N-methyl-aminoacetophenone, N,N-dimethyl-aminoacetophenone, N-methyl-aminobenzophenone, 2-aminocyclohexanone, 4-aminocyclohexanone, N-methyl-2-aminocyclohexanone, N,N-dimethylcyclohexanone, etc., and the corresponding thioketo compounds, such as N-Me-thiopyrrolidone, thiocaprolactam, amino-thioacetophenone, etc.

The cobalt salt used in forming the complex may be a halide or a carboxylate or thiocarboxylate salt including even the carboxylate salts disclosed in the above-mentioned patent, in which case the yields or conversion are improved by having the salt in the complex form. Typical cobalt salts that may be used include $CoCl_2$, $CoCl_3$, $CoBr_2$, $CoBr_3$, $CoI_2$, $CoI_3$, $CoF_2$, $CoF_3$, Co diacetate, Co carbonate, Co diformate, Co diproprionate, Co dihexoate, Co dioctoate, Co dinaphthenate, Co bis (dithioacetate), Co bis (dithiocarbamate), Co bis (mercaptobenzothiazole), etc.

Reducing agents that may be used in the practice of this invention are preferably aluminum trialkyls. Alkyl groups of 1–8 carbon atoms are preferred in the above compounds but even larger groups or aromatic or cycloaliphatic groups such as phenyl, tolyl, xylyl, naphthyl, cyclohexyl, cycloheptyl, etc., may also be present in place of the alkyl groups in the respective compounds.

Typical AlR₃ compounds that may be used for this purpose include, but are not limited to: trimethyl aluminum, triethyl aluminum, tributyl aluminum, tripropyl aluminum, triheptyl aluminum, trioctyl aluminum, triphenyl aluminum, dimethylphenyl aluminum, tribenzyl aluminum, diethyl benzyl aluminum, tricyclohexyl aluminum, dimethyl cyclohexyl aluminum, etc.

The polymerization may be conducted in the temperature range of −50° C to 150° C, preferably 30° to 80° C. Moreover the yields are substantially quantitative over a wide termperature range.

The catalyst combination is preferably prepared in the solution of butadiene and solvent or suspension medium. The order of addition of components is not critical although a preferred embodiment involves the addition of the reducing agent as the last component.

No particular conditions are required for the polymerization of this invention except that an inert atmosphere, such as nitrogen and an inert solvent medium should be used. The pressure may be atmospheric or superatmospheric. The polymerization can be performed either batchwise or continuously, using known apparatus. The polymer can be easily isolated by inactivating and eliminating the catalyst by treatment with alcohols, etc.

Reaction for as little as 15 minutes will produce a notable amount of the desired polymer. However, it is generally desirable to run the reaction for a least 30 minutes and preferably at least four hours to obtain a substantial yield. Generally it is not necessary to conduct the polymerization beyond 30 hours to obtain practical yields.

The 1,2 polybutadiene obtained from the process of this invention has a melting point of 190°-227° C and is completely insoluble at room temperature in benzene, acetone, ethyl ether, n-heptane, cyclohexane, chloroform, carbon tetrachloride, acetonitrile, nitrobenzene, toluene. These polymers are useful for the production of films, fibers and other shaped articles. Such products have high melting point, high crystallinity, excellent solvent resistance, and good mechanical properties, such as impact strength, etc. Moreover, because of the pendent vinyl groups, products made from these polymers have good printability, adhesion and platability, and such polymers are particularly suitable for crosslinking and grafting posttreatments.

SPECIFIC EMBODIMENTS OF THE INVENTIONS

The invention is illustrated by the following examples which are intended merely for purpose of illustration and are not to be regarded as limiting the scope of the invention or the manner in which it may be practiced. Unless specifically indicated otherwise, parts and percentages are given by weight.

EXAMPLE I

A series of runs are made using 28 oz. bottles previously dried and flushed out with dry nitrogen. To each bottle there is added 363 grs. of a toluene solution containing 36.3 grs. 1,3-butadiene (10%). To each such bottle is then added 0.088 millimole of a $CoCl_2$ complex in toluene comprising 16 moles of N-Methyl-pyrrolidone per mole of $CoCl_2$. The cobalt chloride complex is soluble in the reaction medium and gives a blue color. Then 0.7 millimole of $CS_2$ is added with no color change being produced. This composition is next reduced by adding 4.4 millimoles of triisobutyl aluminum. Four sealed bottles prepared as described above are agitated for 4 hours with each bottle being at a different temperature, namely 5°, 30°, 50° and 80° C respectively. In each case a crystalline insoluble polymer is obtained which is isolated and dried. Conversion in each case is over 95%. The products have melting points in the range of 190° to 227° C, and have over 90% 1,2 microstructure. These are highly syndiotactic.

EXAMPLE II

A series of polymerization are conducted using the procedure of Example I with a variety of temperatures and the following catalyst proportions:

| | |
|---|---|
| Millimoles of Co per 100 gms. monomer: | 2.5 |
| Molar ratio - Al/Co | 100 |
| Molar ratio - $CS_2$/Co | 10 |

The percent conversions are as follows:

| | |
|---|---|
| −30° C | 72% |
| 5° C | 88% |
| 30° C | 100% |
| 50° C | 100% |
| 60° C | 100% |
| 80° C | 100% | in each case the 1,2-syndiotactic content is about 98%. The polymer produced at 50° C is tested and found to have a Rockwell Hardness M of 47, an Izod impact resistance of 4.2, a Gardner impact of 20, a flexural strength of $8.7 \times 10^3$ psi, and a flexural modulus of $4.8 \times 10^5$ psi.

EXAMPLE III

The procedure of Example I is repeated a number of times using each time a temperature of 5° C and in place of the N-Methyl pyrrolidone there is used a toluene solution of 0.024 millimole of a complex comprising 6 moles of caprolactam per mole of anhydrous $CoCl_2$.

The other conditions and results are tabulated below:

| Triisobutyl Aluminum mM | CS $mM^2$ | Al/Co | M.P. of Polymer (° C) | % Conv. |
|---|---|---|---|---|
| 1.20 | 0.5 | 50 | 218 | 61 |
| 2.40 | 0.5 | 100 | 217 | 53 |
| 2.40 | 0.5 | 100 | 218 | 58 |
| 2.40 | 0.5 | 100 | 217.5 | 64 |

In each case the polymer is similar to those obtained in Example I.

EXAMPLE IV

The procedure of Example III is repeated at a polymerization temperature of 30° C using 0.5 millimoles of a $CoCl_2$ complex in which 8 moles of caprolactam are used per mole of $CoCl_2$, 0.25 millimoles of $CS_2$ and 2.50 mM of triisobutyl aluminum so that the Al/Co ratio is 50/1 and the $CS_2$/Co ratio is 50/1. The polymer obtained is similar to that of Example III but the conversion is about 90%.

EXAMPLE V

The procedure of Example IV is repeated at 50° C with results very similar to those obtained in Example IV.

EXAMPLE VI

The procedure of Example I is repeated a number of times with similar results using in place of the N-methylpyrrolidone equivalent amounts respectively of:

a. Pyrrolidone
b. p-Aminoacetophenone
c. N,N-Dimethyl-p-aminoacetophenone
d. N-Methyl-2-aminocyclohexanone
e. N-Methyl-thiopyrrolidone
f. Thiocaprolactam

EXAMPLE VII

The procedure of Example I is repeated a number of times with similar results using in place of the triisobutyl aluminum equivalent amounts respectively of:
a. Triisopropyl aluminum
b. Triethyl aluminum
c. Tribenzyl aluminum
d. Triphenyl aluminum
e. Diethyl phenyl aluminum

EXAMPLE VIII

The procedure of Example I is repeated a number of times with similar results using in place of the $CoCl_2$ equivalent amounts respectively of:
a. $CoCl_3$
b. $Co(OOCCH_3)_2$
c. $Co(OOCC_6H_5)_2$
d. $CoBr_2$
e. $CoCO_3$
f. $Co(SSCCH_3)_2$
g. Co dioctoate While certain features of this invention have been described in detail with respect to various embodiments thereof, it will, of course, be apparent that other modifications can be made within the spirit and scope of this invention, and it is not intended to limit the invention to the exact details shown above except insofar as they are defined in the following claims.

The invention claimed is:

1. A process for the preparation of polybutadiene high in syndiotactic 1,2 structure range of 190°–227° C., which comprises polymerizing 1,3-butadiene in the liquid phase in the presence of a catalyst composition consisting essentially of:
   a. a complex of a cobalt salt selected from the class consisting of halides, carboxylates, carbonate and thiocarboxylates, said complex being formed with a cyclic compound having an amino nitrogen and a keto or thioketo group therein selected from the class consisting of N-methyl-pyrrolidone, pyrrolidone, caprolactam, p-aminoacetophenone, N,N-dimethyl-p-aminoacetophenone, N-methyl-2-aminocyclohexanone, N-methyl-thiopyrrolidone and thiocaprolactam;
   b. a reducing agent having the formula $AlR_3$, wherein R is a hydrocarbon radical of 1–8 carbon atoms; and
   c. $CS_2$.

2. The process of claim 1 in which said reducing agent is triisobutyl aluminum.

3. The process of claim 1 in which said reducing agent is an aluminum trialkyl.

4. The process of claim 3 in which said complex former is N-methylpyrrolidone.

5. The process of claim 3 in which said complex former is a caprolactam.

6. The process of claim 3 in which said complex former is pyrrolidone.

7. The process of claim 3 in which said complex former is an p-amino-acetophenone.

8. The process of claim 7, in which said complex former is N-methylpyrrolidone and is used in a proportion of 1–16 moles per mole of Co salt.

9. The process of claim 8 in which said cobalt salt is cobaltous chloride.

10. The process of claim 9 in which said complex former is caprolactam and is used in a proportion of 1–6 moles per mole of Co salt.

11. The process of claim 10 in which said cobalt salt is cobaltous chloride.

12. The process of claim 1 in which 1–16 moles of complex former is used per mole of Co salt; said cobalt salt is used in a proportion of 0.02–0.1 millimoles per 100 grams of butadiene; the proportion of reducing agent is 25–75 moles of Al compound per mole of Co salt; and the proportion of $CS_2$ is 2–6 moles per mole of Co salt.

13. The process of claim 12 in which said reducing agent is a trialkyl aluminum, said complex former is N-methylpyrrolidone used in a proportion of 1–16 moles per mole of Co salt, and said cobalt salt is cobaltous chloride.

14. The process of claim 12 in which said reducing agent is a trialkyl aluminum, said complex former is caprolactam used in proportion of 1–6 moles of caprolactam per mole of Co salt, and said cobalt salt is cobaltous chloride.

* * * * *